United States Patent [19]

Ariizumi et al.

[11] Patent Number: 4,821,776
[45] Date of Patent: Apr. 18, 1989

[54] AIR PILOT OPERATED DIRECTIONAL CONTROL VALVE

[75] Inventors: Rozo Ariizumi, Urawa; Masakuni Kainuma, Ohmiya, both of Japan

[73] Assignee: Fujikura Rubber Ltd, Tokyo, Japan

[21] Appl. No.: 6,842

[22] Filed: Jan. 27, 1987

[30] Foreign Application Priority Data

Jan. 31, 1986 [JP] Japan .................................. 61-19258

[51] Int. Cl.⁴ ........................................... F16K 11/048
[52] U.S. Cl. ............................ 137/625.4; 137/625.33;
137/625.5; 137/625.66
[58] Field of Search ............. 137/625.33, 625.4, 625.5,
137/625.66

[56] References Cited

U.S. PATENT DOCUMENTS

| 2,838,068 | 6/1958 | Ray | 137/625.33 |
| 3,707,162 | 12/1972 | Bachmann | 137/625.66 X |
| 3,794,075 | 2/1974 | Stoll et al. | 137/625.66 |
| 4,046,159 | 9/1977 | Pegourie | 137/625.66 X |
| 4,615,353 | 10/1986 | McKee | 137/625.66 X |

FOREIGN PATENT DOCUMENTS

| 1650571 | 11/1970 | Fed. Rep. of Germany . |
| 2125174 | 11/1972 | Fed. Rep. of Germany . |
| 2840486 | 3/1980 | Fed. Rep. of Germany ... 137/625.5 |
| 1378949 | 9/1963 | France . |

Primary Examiner—Gerald A. Michalsky
Attorney, Agent, or Firm—Beveridge, DeGrandi & Weilacher

[57] ABSTRACT

An air pilot operated directional control valve for selectively connecting a normally open port to two selection ports, by an axial movement of a plunger with valve seats which are adapted to selectively close the axial open ends of the selection ports. The valve has diaphragms which define therebetween a control chamber in which the selection ports and the normally open port open. The plunger is continuously biased by a spring in one direction. The valve also has a pilot pressure chamber which is defined by one of the diaphragms, so that when the pilot pressure exceeds a predetermined value, the plunger moves in the axial direction against the spring to switch the connection between the normally open port and the selection ports.

13 Claims, 4 Drawing Sheets

AIR PILOT OPERATED DIRECTIONAL CONTROL VALVE

BACKGROUND OF THE INVENTION

1. Field of the Invention

The present invention relates to an air pilot operated directional control valve which controls a fluid connection between a normally open valve port and selection valve ports by an air pilot pressure.

2. Description of the Related Art

A known two way-three port directional control valve which usually has one open inlet port and two outlet ports which can be selectively connected to the inlet port or two inlet ports and one open outlet port to which the inlet ports can be selectively connected is actuated by a spool or a diaphragm which is, however, rather complex in construction and expensive.

An air pilot operated directional control valve is also known, which is simple in construction and relatively inexpensive. However, there is no highly reliable pilot operated directional control valve hitherto known, due to, as example, possible cause of failure in the sliding parts being eliminated. In addition, in a known pilot operated directional control valve, it is very difficult to actuate a valve by a snap action which is desirable in order to control the fluid connection, when the pilot pressure exceeds a predetermined value.

The primary object of the present invention is, therefore, to provide an air pilot operated directional control valve in which the valve switches its flow paths in a snap action when the pilot pressure exceeds a predetermined value and in which no reverse switching of flow paths takes place by a slight fluctuation of the pilot pressure.

SUMMARY OF THE INVENTION

In order to achieve the object of the invention mentioned above, an air pilot operated directional control valve according to the present invention has a plunger which is arranged in a valve housing or casing to actuate in response to the pilot pressure, and a pair of diaphragms which are spaced from each other in an axial direction of the plunger to define a control chamber between the plunger and the valve housing. The control chamber has a normally open port and two selection ports opening into the control chamber. The two selection ports have inlet openings which are connected to the control chamber and which are opposed to each other with respect to the direction of the axis of the plunger. The plunger has valve bodies with valve seats which selectively open and close the respective inlet openings of the selection ports. The plunger is continuously biased by a spring means in a direction opposite to the direction of the movement of the plunger by the pilot pressure.

BRIEF DESCRIPTION OF THE DRAWINGS

The invention will be discussed below in detail, with reference to the drawings, in which.

DESCRIPTION OF THE PREFERRED EMBODIMENTS

Figure 6:
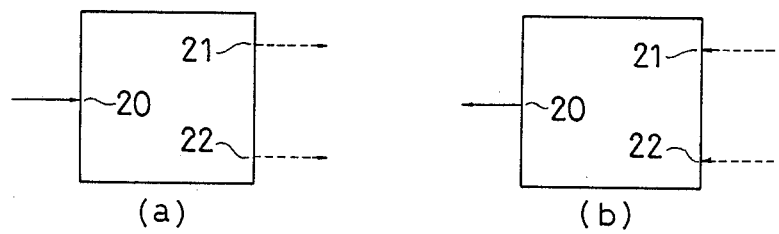

FIGS. 6A and 6B show different modes of a two way-three directional control valve. In FIG. 6A, the valve has one normally open inlet port 20 and two selection outlet ports 21 and 22 which are selectively connected to the inlet port 20. In FIG. 6B, the valve has two inlet ports 21 and 22, and one normally open outlet port 20 to which the two inlet ports can be selectively connected to the outlet port 20.

In FIGS. 1 to 4, the valve has a cylindrical casing 11 which has therein a plunger 12 extending in the length of and at the center of the casing 11. The casing 11 consists of upper casing 11a, port casing 11b, spacer casing 11c, and lower casing 11d, which are all connected together. The plunger 12 has a valve body 12b to which a retainer 12a is secured by a clamping bolt 12f. An upper end diaphragm 15 is provided between the retainer 12a and the valve body 12b. The periphery of the upper diaphragm 15 is secured to the casing 11 between the upper casing 11a and the port casing 11b. The plunger 12 has a lower retainer 12d which is connected to the valve body 12b through a spacer 12c by means of a lock nut 12e. Between the valve body 12b and the spacer 12c is provided an intermediate diaphragm 14 which is secured on the periphery to the casing 11 between the port casing 11b and the spacer casing 11c. Also, a lower end diaphragm 13 is provided between the spacer 12c and the lower retainer 12d, so that the diaphragm 13 is secured on the periphery to the casing 11 between the lower casing 11d and the spacer casing 11c.

A pilot pressure chamber 16 is defined under the lower diaphragm 13 and inside the lower casing 11d, and a control chamber 17 is defined between the upper diaphragm 15 and the intermediate diaphragm 14 and inside the port casing 11b.

When the plunger 12 moves in the casing 11 in the axial direction thereof, the diaphragms 13, 14 and 15 which are connected to the plunger 12 at the central portions of the diaphragms and which are connected to the casing 11 at the circumferential portions of the diaphragms deform. Namely, the plunger 12 is movably held by the deformable diaphragms 13, 14 and 15 in the casing 11.

The pilot pressure chamber 16 has a pilot pressure passage 18 opening therein, which is formed in the lower casing 11d and which is connected to a pilot pressure source P. The upper casing 11a has an axial passage 19a opening therein, which is connected to an atmospheric chamber 19 defined in the upper casing 11a and above the upper diaphragm 15. The opening 19a and the passage 18 extend in the axial direction of the plunger 12.

The port casing 11b of the casing 11 has a normally open port 20 (FIG. 4) which is connected to the control chamber 17, and two selection ports 21 and 22 which open into the control chamber 17. The normally open port 20 is a radial passage formed in the port casing 11b, as can be seen from FIG. 4. On the contrary, the selection ports 21 and 22 are formed with radial passages 21a and 22a, semicircular passages 21b and 22b, connected to the radial passages 21a and 22a, and axial passages 21c and 22c which are connected to the semicircular passages 21b and 22b, respectively. A plurality of axial passages 21c and 22c are provided for each of semicircular passages 21b and 22b. The axial passages 21c extend from the semicircular passage 21b in a direction opposite to that of the axial passages 22c extending from the semicircular passage 22b. The axial passages 21c and 22c are opposed to annular valve seats 23 and 24 which are provided on the valve body 12b, respectively. The valve seats 23 and 24 lie in planes normal to the axis of the plunger 12, so that the axial passages 21c and 22c are selectively closed by the respective valve seats 23 and 24, in accordance with the axial displacement of the plunger 12. The valve seats 23 and 24 also serve as pressure receiving plates which receive the pressurized air ejected from the respective axial passages 21c and 22c to cause the axial movement of the plunger 12 in accordance with the ejection energy.

The plunger 12 is continuously biased by a compression spring 25 which is provided in the atmospheric chamber 19, toward the pilot pressure chamber 16, so that until the pilot pressure in the pilot pressure chamber 16 exceeds a predetermined value, the valve seat 23 comes into contact with the axial passages 21c to close the latter. In this position in which the axial passages 21c are closed, the fluid connection is established between the selection port 22 and the control chamber 17.

The total sectional area S1 of the axial passages 21c and the total sectional area S2 of the axial passages 22c can be either identical to or different from each other, in accordance with the switching mode of a directional control valve to which the invention is applied or pressure differences between in the ports 20, 21 and 22, if any, in order to ensure a snap action of the valve seats 23 and 24. In the illustrated embodiment, the total sectional area S1 is larger than the total sectional area S2 (S1>S2), so that a directional control valve as shown in FIG. 6B is realized in which the pressurized fluid flows from one of the inlet ports 21 and 22 into the normally open outlet port 20, provided that the pressure in the selection port 21 is identical to that in the selection port 22.

The spacer casing 11c has a bleed hole 27 which connects an air bleed chamber 26 defined in the spacer casing 11c between the intermediate and lower diaphragms 14 and 13 to the atmosphere. The bleed hole 27 ensures that the diaphragms 13 and 14 deform positively under pressure in the pilot pressure chamber 16 and the control chamber 17, respectively.

The directional control valve constructed above according to the present invention operates as follows.

Figure 1:
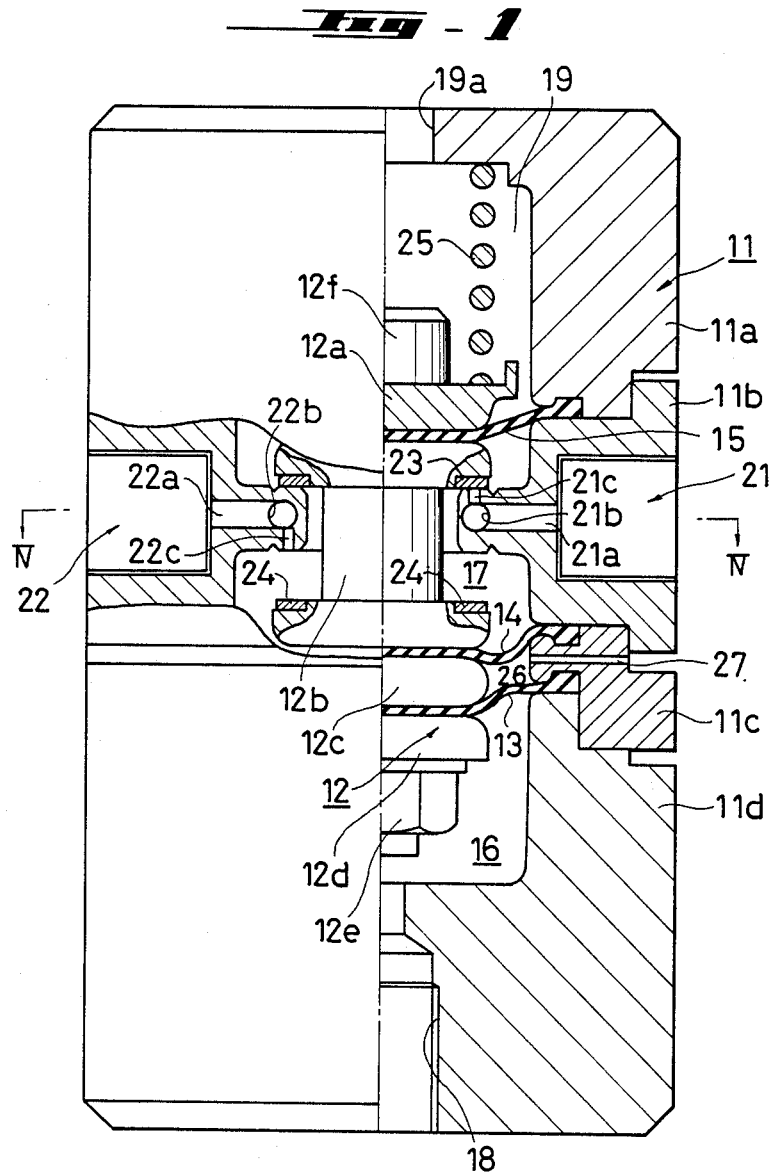
FIG. 1 to 3 are partial sectional views of a directional control valve shown in three different valve positions, according to the present invention.

When there is no pilot pressure in the pilot pressure chamber 16, the plunger 12 is in its lowermost position as shown in FIG. 1, with the help of the compression spring 25, so that the valve seat 23 closes the axial passages 21c of the selection port 21. In this position, since the selection port 22 communicates with the control chamber 17, the pressurized fluid flows from the selection port 22 into the normally open port 20.

Figure 2:
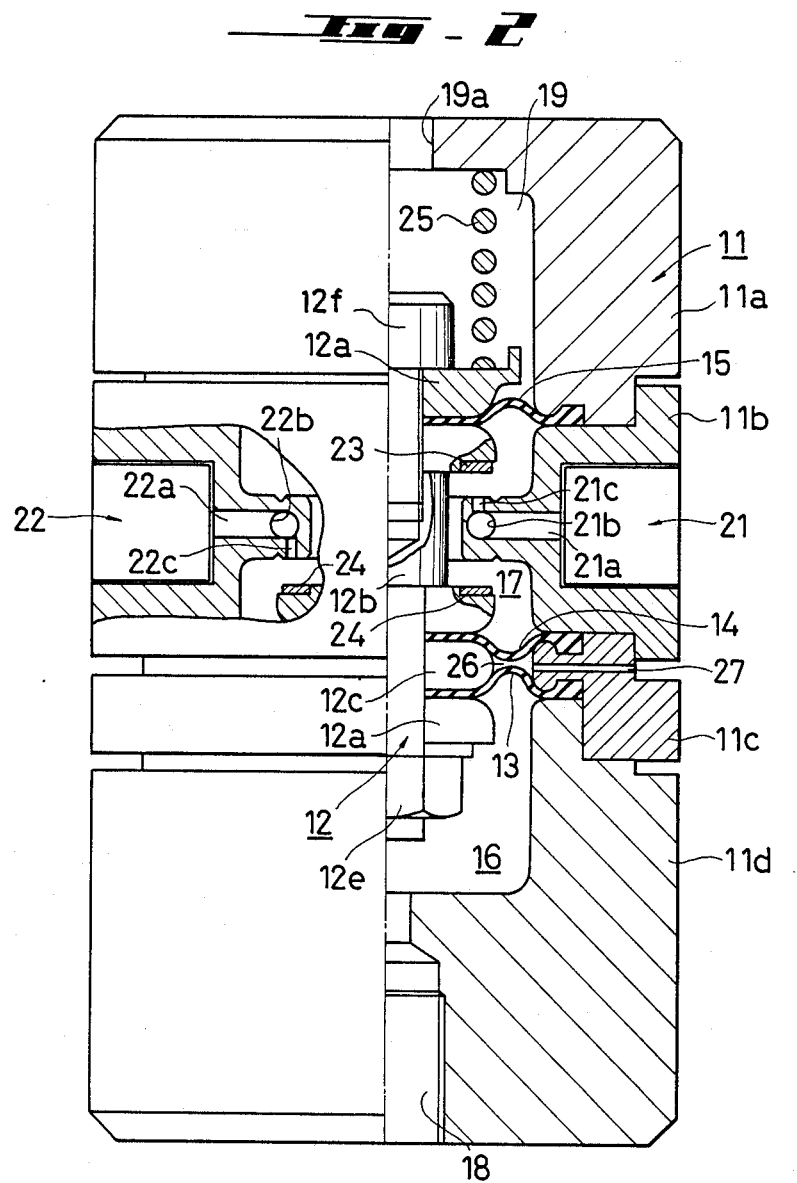
Figure 3:
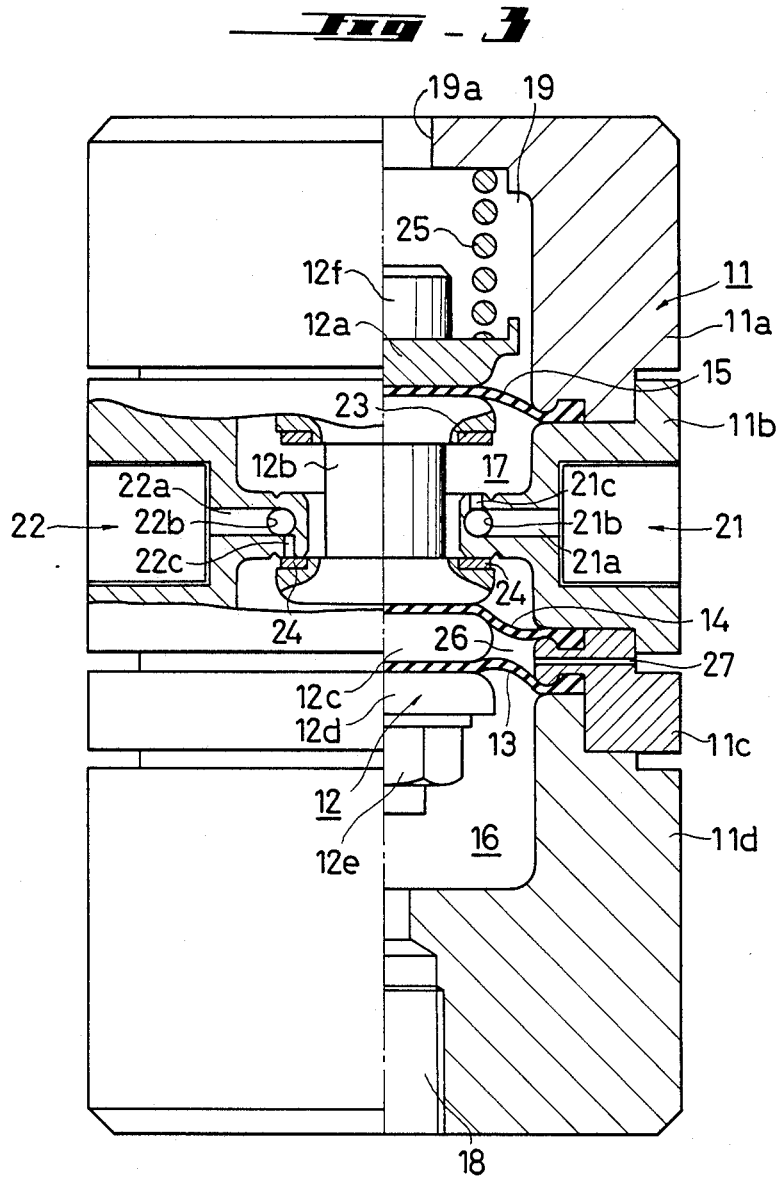
Figure 4:
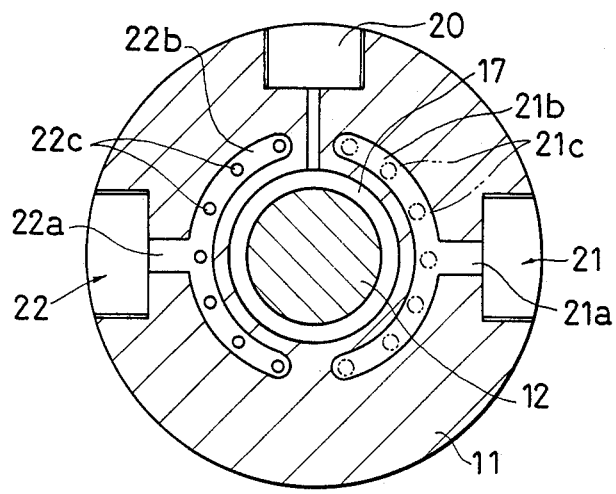
FIG. 4 is a sectional view taken along the line IV—IV in FIG. 1.

When the pilot pressure is introduced into the pilot pressure chamber 16 through the pilot pressure passage 18 of the lower casing 11d, the pilot pressure acts on the lower diaphragm 13. When the pilot pressure becomes larger than the spring force of the compression spring 25, the plunger 12 begins moving upward in the axial direction, as shown in FIG. 2. The upward movement of the plunger causes the valve seat 23 to separate from the axial passages 21c of the selection port 21, so that the selection port 21 opens. As a result of this, the fluid in the selection port 21 flows into the control chamber 17, through the axial passages 21c. It will be appreciated that the pressurized fluid from the selection port 22 continues to flow into the control chamber 17 through the axial passages 22c; nevertheless, the plunger 12 quickly moves upward to an uppermost position as shown in FIG. 3, since the total sectional area S1 of the axial passages 21c is larger than that S2 of the axial passages 22c (S1>S2), as mentioned before, resulting in a larger upward axial force applied to the plunger by the pressurized fluid from the axial passages 21c than the downward axial force by the fluid pressure from the axial passages 22c. Namely, the axial force which tends to move the plunger upward is larger than the axial force which tends to move the plunger downward. The upward movement of the plunger 12 takes place in a moment, due to a difference in axial force between the axial passages 21c and 22c. When the plunger 12 comes to the uppermost position as shown in FIG. 3, the valve seat 24 comes into contact with the axial passages 22c to close them, so that the pressurized fluid from the selection port 21 flows into the normally open port 20. In the uppermost position of the plunger 12, it is continuously subjected to the axial force by the pressurized fluid ejected from the axial passages 21c in the upward direction, and accordingly the plunger 12 can be stably maintained at the uppermost position. Therefore, even if the pilot pressure in the pilot pressure chamber 16 slightly fluctuates (decreases), no downward movement of the plunger 12 does not take place. Namely, a possible slight fluctuation of the pilot pressure in the pilot pressure chamber 16 does not cause an accidental switching in the fluid connection between the normally open port and the selection ports, which would otherwise occur, due to the fluctuation of the pilot pressure.

Figure 5:
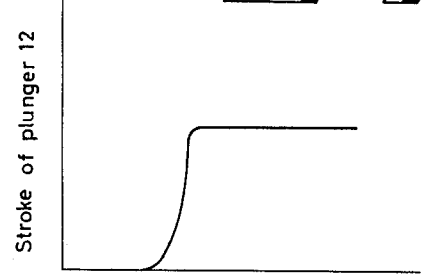
FIG. 5 is a diagram showing characteristics of movement of a plunger shown in FIGS. 1 to 3; and, FIGS. 6A and 6B are schematic views of a two way-three port directional control valve in two different modes.

FIG. 5 shows a relation between the pilot pressure and the axial displacement of the plunger 12. It can be understood from FIG. 5 that the plunger 12 moves in a snap action at point A at which the pilot pressure in the pilot pressure chamber 16 is a predetermined value.

In the illustrated embodiment, three separate diaphragms 13, 14 and 15 are provided. Alternatively, it is also possible to provide only two separate diaphragms in which the diaphragms 13 and 14 are replaced with a single diaphragm. In this alternative, there is no air bleed chamber 26, and accordingly, such a single diaphragm repeatedly deforms into convex and concave shapes, depending on the pressure difference between in the pilot pressure chamber 16 and the control chamber 17. This, however, may decrease the service life of the single diaphragm, depending on the fatigue properties of the material of which the diaphragm is made. Accordingly, from the viewpoint of service life of the diaphragm, the provision of separate diaphragms 13 and 14 is preferable to increase the service life thereof, in comparison with a single diaphragm. Namely, the provision of two separate diaphragms 13 and 14 which define the air bleed chamber 26 therebetween prevents the repeated deformation in opposite directions into concave and convex shapes of the diaphragms. That is, the diaphragms 13 and 14 deform only in one direction (concave or convex), respectively, in the illustrated embodiment in which the separate diaphragms 13 and 14 are provided.

The above discussion is directed to a directional control valve shown in FIG. 6B in which the valve has two selection inlet ports and one normally open outlet port. It can be easily understood that the invention can be, of course, applied to a directional control valve as shown in FIG. 6A in which the valve has one open inlet port and two selection outlet ports.

As mentioned before, the total sectional area S1 of the axial passages 21c is larger than the total sectional area S2 of the axial passages 22c, in the illustrated embodiment. Alternatively, it is also possible to make S1 equal to or smaller than S2, depending on the pressure difference between the selection ports 21 and 22. Namely, the total sectional areas S1 and S2 cannot be determined individually but can be determined, taking the pressure difference between the selection ports 21 and 22 into consideration.

As can be seen from the above discussion, according to the present invention, the plunger which is an actuator for switching valve ports can move in a snap action due to a pilot pressure, so that the fluid connection between the valve ports can be quickly switched. Furthermore, the absence of sliding portions in the switching mechanism of the present invention contributes an increased reliability.

We claim:

1. A snap acting air pilot operated directional control valve for controlling a fluid connection between one normally open port and two selection ports, comprising a casing, a plunger which is arranged in the casing to move in the axial directions thereof in the casing and which moves in response to a pilot pressure, elastically deformable means for enabling the plunger to axially move, said elastically deformable means being connected to the casing and the plunger and being arranged to define a control chamber in the casing, said open port and the selection ports being connected to the control chamber to open into the control chamber, said selection ports having axial open ends which face in opposite axial directions with respect to the control chamber, said plunger being provided with valve seats to selectively close the axial open ends of the selection ports in accordance with the axial displacement of the plunger, each of said valve seats being rigidly attached to the plunger and being positioned in direct alignment with its corresponding selection port to receive energy of ejected air and cause quick axial movement of the plunger in the event that air is ejected from the respective selection port, and spring means for biasing the plunger in a direction opposite to a direction of the movement of the plunger by the pilot pressure, whereby the plunger moves in a snap action when the pilot pressure exceeds a predetermined valve, said elastically deformable means comprising three diaphragms consisting of two end diaphragms and one intermediate diaphragm between the end diaphragms, said three diaphragms being connected to the plunger so as to axially move together therewith, said control chamber being defined between and by one of the end diaphragms and the intermediate diaphragm.

2. An air pilot operated directional control valve according to claim 1, further comprising an air bleed chamber which is defined by and between the other end diaphragm and the intermediate diaphragm and which is connected to the atmosphere.

3. An air pilot operated directional control valve according to claim 2, further comprising a pilot pressure chamber which is defined by said other end diaphragm in the casing and which is opposed to the control chamber in the axial direction of the plunger, so that the air bleed chamber is located between the control chamber and the pilot pressure chamber, said pilot pressure chamber being connected to an pilot pressure source.

4. An air pilot operated directional control valve according to claim 1, wherein said valve seats lie in planes perpendicular to the axis of the plunger.

5. An air pilot operated directional control valve according to claim 1, wherein said selection ports have radial passages, semicircular passages connected to the respective radial passages, and a plurality of axial passages which are connected to the respective semicircular passages and which open into the control chamber.

6. An air pilot operated directional control valve according to claim 5, wherein said axial passages have total sectional areas which can be determined in accordance with the pressures of the selection ports.

7. An air pilot operated directional control valve according to claim 6, wherein the total sectional areas of the axial passages of the two selection ports are different from each other.

8. An air pilot operated directional control valve according to claim 1, wherein said one of the end diaphragms defines an atmosphere chamber in the casing in which the spring means is arranged to bias the plunger in the direction opposite to the direction of the movement of the plunger by the pilot pressure.

9. An air pilot operated directional control valve according to claim 1 wherein said selection ports are inlet ports, and said open port is an outlet port.

10. An air pilot operated directional control valve according to claim 1 having only two said seats, wherein said seats are the only means for stopping axial movement of the plunger.

11. A snap acting air pilot operated directional control valve for controlling a fluid connection between one normally open port and two selection ports, comprising a casing, a plunger which is arranged in the casing to move in the axial directions thereof in the casing and which moves in response to a pilot pressure, elastically deformable means for enabling the plunger to axially move, said elastically deformable means being connected to the casing and the plunger and being arranged to define a control chamber in the casing, said open port and the selection ports being connected to the control chamber to open into the control chamber, said selection ports having axial open ends which face in opposite axial directions with respect to the control chamber, said plunger being provided with valve seats to selectively close the axial open ends of the selection ports in accordance with the axial displacement of the plunger, each of said valve seats being rigidly attached to the plunger and being positioned in direct alignment with its corresponding selection port to receive energy of ejected air and cause quick axial movement of the plunger in the event air is ejected from the respective selection port, and spring means for biasing the plunger in a direction opposite to a direction of the movement of the plunger by the pilot pressure, whereby the plunger moves in a snap action when the pilot pressure exceeds a predetermined value, said selection ports having radial passages, semicircular passages connected to the respective radial passages connected to the respective radial passages, and a plurality of axial passages which are connected to the respective semicircular passages and which open into the control chamber.

12. An air pilot operating directional control valve according to claim 11, wherein said axial passages having total sectional areas which can be determined in accordance with the pressures of the selection ports.

13. An air pilot operated directional control valve according to claim 12, wherein the total sectional areas of the axial passages of the two selection ports are different from each other.

* * * * *